Patented Nov. 4, 1930

1,780,604

UNITED STATES PATENT OFFICE

WINFIELD SCOTT, OF NITRO, WEST VIRGINIA, ASSIGNOR TO THE RUBBER SERVICE LABORATORIES COMPANY, OF AKRON, OHIO, A CORPORATION OF OHIO

VULCANIZATION OF RUBBER

No Drawing.   Application filed November 28, 1927.   Serial No. 236,373.

The present invention relates to the manufacture of a vulcanized rubber product by an improved process wherein an unsymmetrically substituted guanidine compound is employed as an accelerator of that process. The invention will be understood from the following description and examples wherein the invention is fully set forth and described.

Various guanidine derivatives heretofore have been described as rubber vulcanization accelerators. The guanidines most effective for use for that purpose, however, have comprised such symmetrical compounds as di-phenyl-guanidine, di-o-tolyl-guanidine and the like. It has now been found that the accelerating power of these compounds can be materially increased by substituting in one of the aryl groups in place of a hydrogen in the para position to one of the imido groups of a di-substituted guanidine, a piperidine nucleus, whereby products such as an aryl-p-piperidyl-aryl guanidine are produced. Similar compounds in which the group is substituted in an ortho position, and mixtures of the ortho and para substituted compounds have also been found to possess valuable rubber vulcanization accelerating properties.

Although the preferred class of accelerating compounds may be manufactured by any of several different processes, one satisfactory mode of obtaining a mixture of an aryl-ortho and an aryl-para-piperidyl-phenyl-guanidine is shown by the following example.

Chlor benzene was nitrated in the usual manner and a product was obtained comprising a mixture of approximately 30% of the ortho and 70% of the para-nitro-chlor benzenes. This mixture was then reacted with piperidine whereby a mixture of the corresponding ortho and para substituted piperidyl-nitro benzenes was obtained. The mixture of the nitro bodies was then reduced by means of iron and hydrochloric acid and the corresponding substituted amino benzenes were obtained. The mixture of substituted o- and p-amino benzenes was then reacted with a mustard oil, preferably with phenyl mustard oil, whereby a mixture of phenyl-p- and phenyl-o-piperidyl-phenyl-thioureas was obtained in the proportion of approximately 70% of the former and 30% of the latter.

The thioureas were then desulphurized and amidated by treatment with lead oxide in the presence of ammonia and the corresponding guanidines were obtained. Other means of manufacturing the preferred type of accelerating compounds are possible. Thus, an equi-molar mixture of aniline with the ortho or para or with a mixture of o- and p-piperidyl-aniline would yield a mixed thiourea upon treatment with carbon bisulfid. The thiourea would then be desulphurized and amidated in the well known manner for carrying out these steps.

Another method of manufacturing the guanidine compound comprises the production of the hydrochloride of the mixed guanidine by the action of cyanogen chloride on an equi-molar mixture of aniline and p-piperidyl-aniline. The free guanidine is readily obtained by treating a solution of the hydrochloride with caustic soda solution in sufficient quantity to neutralize the acid.

Other guanidine compounds analogous to the one particularly set forth in the example can readily be obtained by employing homologues of aniline, such as the toluidines, the xylidenes or other aromatic primary amines in place of aniline set forth. In a like manner, alkyl substituted chlor benzenes and other aryl mustard oils than phenyl mustard oil can be employed in place of the specific compounds mentioned in the various processes for manufacturing the desired compound.

The aryl-p-piperidyl-aryl-guanidines have been found to comprise a class of effective rubber vulcanization accelerators. Thus, a rubber composition comprising 100 parts of pale crepe rubber,
5 parts of zinc oxide,
3.5 parts of sulphur,
0.5 parts of accelerator, was prepared in the well known manner. As an accelerator there was employed in one example phenyl-p-piperidyl-phenyl-guanidine having the formula

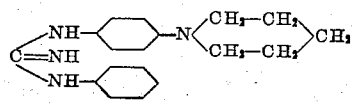

The stock was cured by heating portions of the compounds for different lengths of time in a press maintained under the temperature given by forty pounds of steam pressure to the square inch. It was found that a technical cure resulted after heating the stock for thirty minutes under the conditions set forth. A similar stock was also prepared, containing 0.5 parts of di-phenyl-guanidine in place of the guanidine compound particularly mentioned in the example. Both cured samples were then tested physically and the following results were obtained:

| Accelerator used | Modulus of elasticity at elongations of | | | Tensile strength at break | Ultimate elongation |
|---|---|---|---|---|---|
| | 300% | 500% | 700% | | |
| Di-phenyl-guanidine | 140 | 250 | 857 | 2325 | 870% |
| Phenyl-p-piperidyl-phenyl guanidine | 177 | 357 | 1320 | 3310 | 885% |

From the table it is evident that the preferred class of accelerators produce a cured rubber compound possessing a tensile strength that is approximately 50% greater than that yielded by the use of di-phenyl-guanidine when employed as a vulcanization accelerator in a rubber stock of the same composition. Longer times of cure produce a stock with higher modulus and tensile figures, but the example given illustrates the value of the accelerator in a so-called pure gum stock.

The preferred class of accelerators has also been found to be desirable and effective for use in rubber stocks employed in tire treads as is shown by the following example. A tread stock was compounded in the well known manner comprising 36.5 parts of smoked sheet rubber,
20  parts of amber crepe rubber,
11  parts of zinc oxide,
25  parts carbon black,
3.5 parts of mineral rubber,
1   part of cycline oil,
2   parts of sulphur,
0.5 part of accelerator, for example phenyl-p-piperidyl-phenyl-guanidine.

The resulting rubber compound was then vulcanized by heating portions of the stock for the times indicated in the table at the temperature given by a pressure of forty pounds of steam per square inch, that is, at 287° F. The results obtained from determining the physical characteristics of the stock, vulcanized as described, are as follows:

| Time of cure | Modulus of elasticity in lbs./in.² at elongations of | | Tensile strength at break in lbs./in.² | Ultimate elongation |
|---|---|---|---|---|
| | 300% | 500% | | |
| 60 minutes at 287° F | 1233 | 2920 | 4048 | 640% |
| 90 minutes at 287° F | 1290 | 3105 | 3740 | 580% |

The above results show that vulcanization of the stock for one hour at 287° F. gives a full cure for the tread stock shown. Moreover, the stock is shown to possess desirable commercial properties for a tire tread.

It has also been found that those compounds containing a piperidyl grouping act as good accelerators for the production of a hard rubber compound. For example, a rubber stock comprising 20  parts of smoked sheet rubber,
20  parts of amber crepe rubber,
17.5 parts of zinc oxide,
10  parts of mineral rubber,
27.5 parts of sulphur,
1   part of phenyl - p - piperidyl - phenyl-guanidine was cured to produce a characteristic hard rubber upon heating the compound in a press for approximately two hours at 287° F.

Another example illustrating the wide applicability of the preferred class of accelerators in the manufacture of rubber products of different types is shown in the production of a compound containing a high percentage of zinc oxide suitable for use as a cushion stock employed in pneumatic tires or which may be used as a stock for inner tubes for pneumatic tires for trucks. Such a stock comprises 100 parts of smoked sheet rubber,
15  parts of zinc oxide,
3.5 parts of sulphur,
0.5 part of the accelerator hereinbefore described.

The stock was prepared in the usual well known manner and was cured and subjected to physical testing and the following results thereby obtained:

| Time of cure | Load necessary to produce elongations of | | | Tensile strength at break | Elongation at break |
|---|---|---|---|---|---|
| | 300% | 500% | 700% | | |
| 45 minutes at 287° F | 220 | 555 | 1830 | 3330 | 820% |
| 60 minutes at 287° F | 274 | 660 | 2510 | 3880 | 775% |

Examples of the use in other types of rubber compounds of aryl substituted guanidine accelerators containing at least one methylene amino substituent group in the aryl group are apparent to those skilled in the art to which this invention pertains from a consideration of the various examples hereinbefore set forth.

Since many apparently widely different embodiments of the invention may be made without departing from the spirit thereof, it is understood that the invention is not limited to the specific examples set forth nor limited nor dependent upon the soundness of any theories herein presented by way of explanation; and although there have been specifically described accelerators that may be utilized in promoting the vulcanization of rubber, it is obvious that minor changes may be made in the application of the examples of the invention without departing from the scope thereof.

What is claimed is:

1. The process of manufacturing a vulcanized rubber product which comprises heating a mixture of rubber and sulphur in the presence of an accelerator comprising phenyl-p-piperidyl-phenyl guanidine.

2. The process of manufacturing a vulcanized rubber product which comprises heating a mixture of rubber and sulphur in the presence of an accelerator comprising a symmetrical di-aryl substituted guanidine, one of which aryl substituents contains a piperidyl group para to the imino group.

3. A vulcanized rubber product comprising the product obtained by heating a mixture of rubber and sulphur in the presence of a symmetrical di-aryl substituted guanidine accelerator, one of which aryl substituents contains a piperidyl group para to the imino group.

4. A vulcanized rubber product comprising the product obtained by heating a mixture of rubber and sulphur in the presence of phenyl-p-piperidyl-phenyl guanidine In testimony whereof I hereunto affix my signature.

WINFIELD SCOTT.